(12) United States Patent
Achtermann et al.

(10) Patent No.: US 8,959,454 B2
(45) Date of Patent: Feb. 17, 2015

(54) TABLE MANAGEMENT

(75) Inventors: Jeffrey Mark Achtermann, Austin, TX (US); David Jonathan Levinson, Acworth, GA (US); Gautham Pamu, Round Rock, TX (US); Richard Walton Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 632 days.

(21) Appl. No.: 12/852,833

(22) Filed: Aug. 9, 2010

(65) Prior Publication Data

US 2012/0036474 A1 Feb. 9, 2012

(51) Int. Cl.
G06F 3/048 (2013.01)
G06F 3/0482 (2013.01)
G06F 3/0481 (2013.01)
G06F 17/30 (2006.01)

(52) U.S. Cl.
CPC .......... *G06F 3/0482* (2013.01); *G06F 3/04817* (2013.01); *G06F 17/30572* (2013.01)
USPC ....................................................... 715/810

(58) Field of Classification Search
USPC ........................................................ 715/810
See application file for complete search history.

(56) References Cited

U.S. PATENT DOCUMENTS

| | | | | |
|---|---|---|---|---|
| 5,748,929 A * | 5/1998 | Conrad et al. | ................ | 715/810 |
| 5,874,965 A * | 2/1999 | Takai et al. | ................... | 345/667 |
| 5,995,984 A * | 11/1999 | Lau et al. | ...................... | 715/213 |
| 6,037,939 A * | 3/2000 | Kashiwagi et al. | ........... | 715/798 |
| 6,085,202 A * | 7/2000 | Rao et al. | ....................... | 715/201 |
| 6,151,059 A * | 11/2000 | Schein et al. | .................... | 725/37 |
| 6,380,953 B1 * | 4/2002 | Mizuno | ......................... | 715/764 |
| 7,340,677 B2 * | 3/2008 | Cowperthwaite | ............. | 715/719 |
| 7,890,519 B2 * | 2/2011 | Dettinger et al. | ............. | 707/752 |
| 7,979,362 B2 * | 7/2011 | Zhao et al. | ...................... | 706/11 |
| 8,140,962 B2 * | 3/2012 | Bertram et al. | ................ | 715/227 |
| 2002/0105537 A1 * | 8/2002 | Orbanes et al. | ................ | 345/733 |
| 2004/0220893 A1 * | 11/2004 | Spivack et al. | ................... | 706/46 |
| 2005/0060343 A1 * | 3/2005 | Gottsman et al. | ............. | 707/102 |
| 2006/0106847 A1 * | 5/2006 | Eckardt et al. | ................ | 707/101 |
| 2006/0271887 A1 * | 11/2006 | Bier et al. | ...................... | 715/866 |
| 2006/0288311 A1 * | 12/2006 | Heer et al. | ...................... | 715/853 |
| 2008/0109327 A1 | 5/2008 | Mayle et al. | | |
| 2008/0109762 A1 * | 5/2008 | Hundal et al. | ................ | 715/855 |
| 2008/0134081 A1 | 6/2008 | Jeon et al. | | |
| 2009/0043714 A1 * | 2/2009 | Zhao et al. | ...................... | 706/11 |
| 2009/0193356 A1 * | 7/2009 | Saba | ............................. | 715/801 |
| 2009/0235186 A1 | 9/2009 | Howard et al. | | |
| 2009/0265623 A1 * | 10/2009 | Kho et al. | ...................... | 715/273 |
| 2009/0295826 A1 * | 12/2009 | Good et al. | ..................... | 345/619 |
| 2010/0057684 A1 * | 3/2010 | Williamson | ...................... | 707/3 |
| 2010/0174974 A1 * | 7/2010 | Brisebois et al. | ............. | 715/223 |
| 2010/0199161 A1 * | 8/2010 | Aureglia et al. | ............. | 715/218 |
| 2010/0211564 A1 * | 8/2010 | Cohen et al. | ................... | 707/722 |
| 2010/0312747 A1 * | 12/2010 | Stolte et al. | .................... | 707/602 |

(Continued)

*Primary Examiner* — William Bashore
*Assistant Examiner* — Hien Duong
(74) *Attorney, Agent, or Firm* — Yee & Associates, P.C.; Lisa J. Ulrich

(57) ABSTRACT

Managing a display of objects is provided. A processor unit displays a graphical control configured to receive a user input of a value to control the display of a set of objects relative to a group of properties for the set of objects in a table. A processor unit changes the display of the set of objects to a ratio in a plurality of ratios in the table for the set of objects relative to the group of properties for the set of objects in the table based on the value.

16 Claims, 8 Drawing Sheets

(56) References Cited

U.S. PATENT DOCUMENTS

2011/0035701 A1* 2/2011 Williams et al. .............. 715/784
2011/0314400 A1* 12/2011 Mital et al. .................... 715/771
2011/0316884 A1* 12/2011 Giambalvo et al. ........... 345/660
2014/0058904 A1* 2/2014 Ackley et al. ................ 705/27.1

* cited by examiner

TABLE MANAGEMENT

BACKGROUND

1. Field

The present disclosure relates generally to an improved data processing system and, more particularly, to a method and apparatus for managing a display of objects. Still, more particularly, the present disclosure relates to a method and apparatus for managing a ratio of objects in relation to properties of the objects.

2. Description of the Related Art

A model for user interface (UI) design involves presenting software objects, also referred to herein as objects, in a list and then placing actions adjacent to the objects. Objects are items in a program displayed on a user interface and capable of being interacted with by a user. Actions are commands that may be executed on an object. A user may first select the object and then select the action that applies to that object. Within user interface model, the user interface objects are predominant. User interface actions may be a close second in importance, followed by the properties of the objects. Properties of the objects may be traits or characteristics of the objects.

Changing the properties of an object may be a frequent function of user interface applications. Finding objects and changing their properties may use a user interface widget. The widget may be a table. Tables display objects, as well as their properties. Each row of the table may contain one object and each column may display one property of the object. For example, if the objects within an application are different types of animals, then one row could represent dogs while another row could represent cats. The columns within the table would show some of the properties of the objects.

SUMMARY

In one illustrative embodiment, a method is present to manage a display of objects. A processor unit displays a graphical control configured to receive a user input of a value to control the display of a set of objects relative to a group of properties for the set of objects in a table. A processor unit changes the display of the set of objects to a ratio in a plurality of ratios in the table for the set of objects relative to the group of properties for the set of objects in the table based on the value.

In another illustrative embodiment, a method is present to manage a display of objects. A processor unit displays the display of a set of objects relative to a group of properties for the set of objects in a table configured to receive a user input to control the display of a set of objects relative to a group of properties for the set of objects in the table. The processor unit changes the display of the set of objects to a ratio in a plurality of ratios in the table for the set of objects relative to the group of properties for the set of objects in the table based on the value.

In yet another illustrative embodiment, a computer system is present for managing a display of objects. The computer system comprises a processor, a computer readable memory and a computer readable storage medium. The computer system comprises first program instructions to display a graphical control configured to receive a user input of a value to control the display of a set of objects relative to a group of properties for the set of objects in a table. The computer system comprises second program instructions to change the display of the set of objects to a ratio in a plurality of ratios in the table for the set of objects relative to the group of properties for the set of objects in the table based on the value. The first and second program instructions are stored on the computer readable storage medium for execution by the processor via the computer readable memory.

In yet another illustrative embodiment, a computer program product is present for managing a display of objects. The computer program product comprises a computer readable storage medium. The computer program product comprises first program instructions to display a graphical control configured to receive a user input of a value to control the display of a set of objects relative to a group of properties for the set of objects in a table. The computer program product comprises second program instructions to change the display of the set of objects to a ratio in a plurality of ratios in the table for the set of objects relative to the group of properties for the set of objects in the table based on the value. The first and second program instructions are stored on the computer readable storage medium.

DETAILED DESCRIPTION

Figure 1:
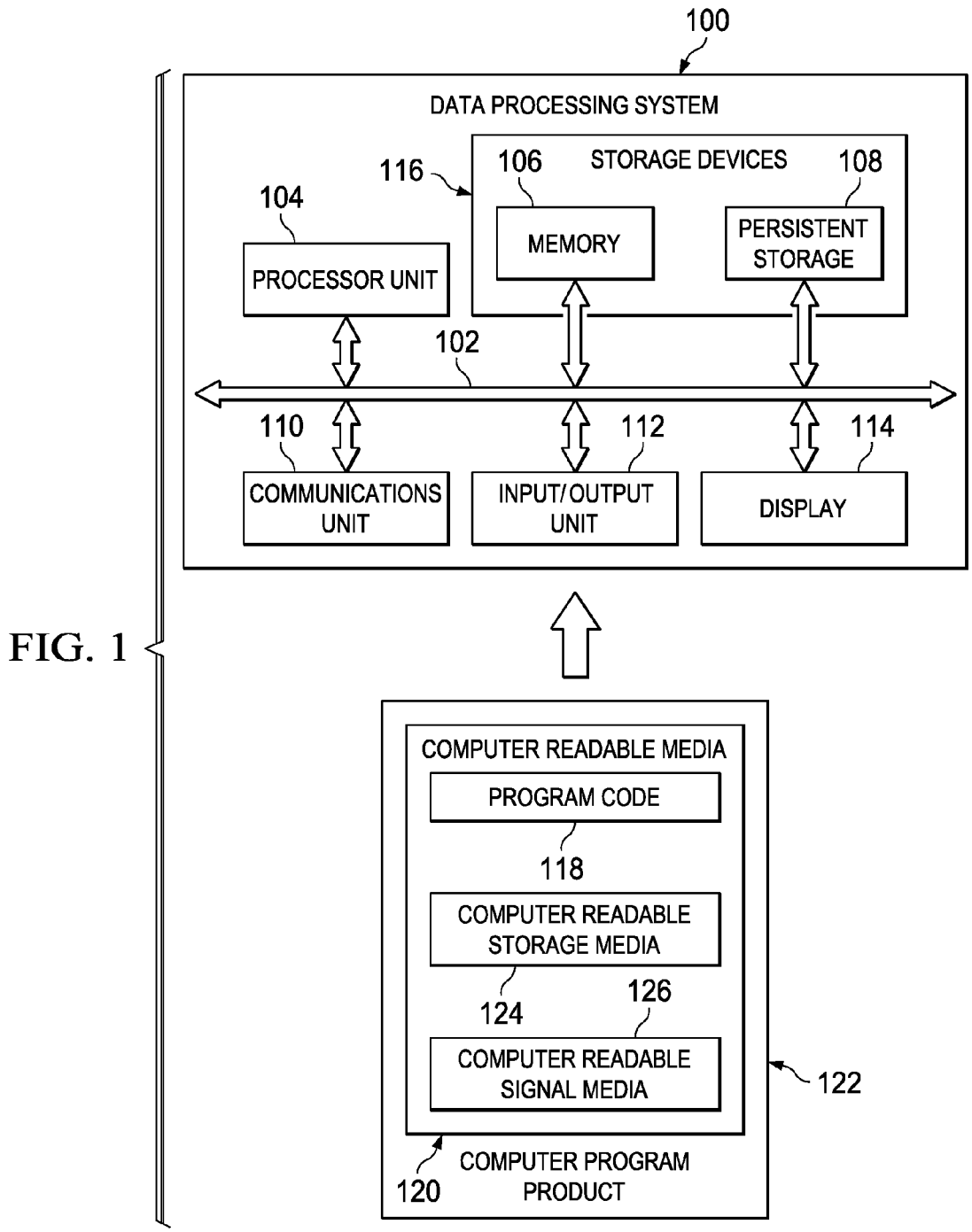
FIG. 1 is an illustration of a data processing system depicted in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable data storage medium(s) having computer readable program code embodied thereon.

Any combination of one or more computer readable data storage medium(s) may be utilized. A computer readable data storage medium may be, for example, but not limited to, an electronic, magnetic, optical, or semiconductor system, apparatus, or device, or any suitable combination of the foregoing. More specific examples (a non-exhaustive list) of the computer readable data storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable data storage medium may be any tangible medium that can store a program for use by or in connection with an instruction execution system, apparatus, or device.

Program code embodied on a computer readable data storage medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable data storage medium that can direct a computer, other programmable data processing apparatus, or other devices to function in a particular manner, such that the instructions stored in the computer readable data storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for processing by processor unit 104. The processes of the different embodiments may be performed by processor unit 104 using computer implemented instructions, which may be located in a memory, such as memory 106.

These instructions are referred to as program code, computer-usable program code, or computer-readable program code that may be read and processed by a processor in processor unit 104. The program code in the different embodiments may be embodied on different physical or computer readable storage medium, such as memory 106 or persistent storage 108.

Program code 118 is located in a functional form on computer readable medium 120 that is selectively removable and may be loaded onto or transferred to data processing system 100 for processing by processor unit 104. Program code 118 and computer readable medium 120 form computer program product 122 in these examples. In one example, computer readable medium 120 may be computer readable storage medium 124 or computer readable signal medium 126. Computer readable storage medium 124 may include, for example, an optical or magnetic disk that is inserted or placed into a drive or other device that is part of persistent storage 108 for transfer onto a storage device, such as a hard drive, that is part of persistent storage 108. Computer readable storage medium 124 also may take the form of a persistent storage, such as a hard drive, a thumb drive, or a flash memory, that is connected to data processing system 100. In some instances, computer readable storage medium 124 may not be removable from data processing system 100. In these illustrative examples, computer readable storage medium 124 is a non-transitory computer readable storage medium.

Alternatively, program code 118 may be transferred to data processing system 100 using computer readable signal medium 126. Computer readable signal medium 126 may be, for example, a propagated data signal containing program code 118. For example, computer readable signal medium 126 may be an electromagnetic signal, an optical signal, and/or any other suitable type of signal. These signals may be transmitted over communication links, such as wireless communication links, optical fiber cable, coaxial cable, a wire, and/or any other suitable type of communications link. In other words, the communications link and/or the connection may be physical or wireless in the illustrative examples.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of running program code.

As another example, a storage device in data processing system 100 is any hardware apparatus that may store data. Memory 106, persistent storage 108, and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

The different illustrative embodiments recognize and take into account that many user interface applications present either a list or table of many objects with only a few columns of properties or a notebook view of only one object with all of that object's properties. Different tasks may use different levels of detail. Similarly, different users may want different levels of view for the objects and the properties of the objects.

The different illustrative embodiments provide a method, computer system, and computer program product to manage a display of objects. A processor unit displays a graphical control configured to receive a user input of a value to control the display of a set of objects relative to a group of properties for the set of objects in a table. A processor unit changes the display of the set of objects to a ratio in a plurality of ratios in the table for the set of objects relative to the group of properties for the set of objects in the table based on the value.

Figure 2:
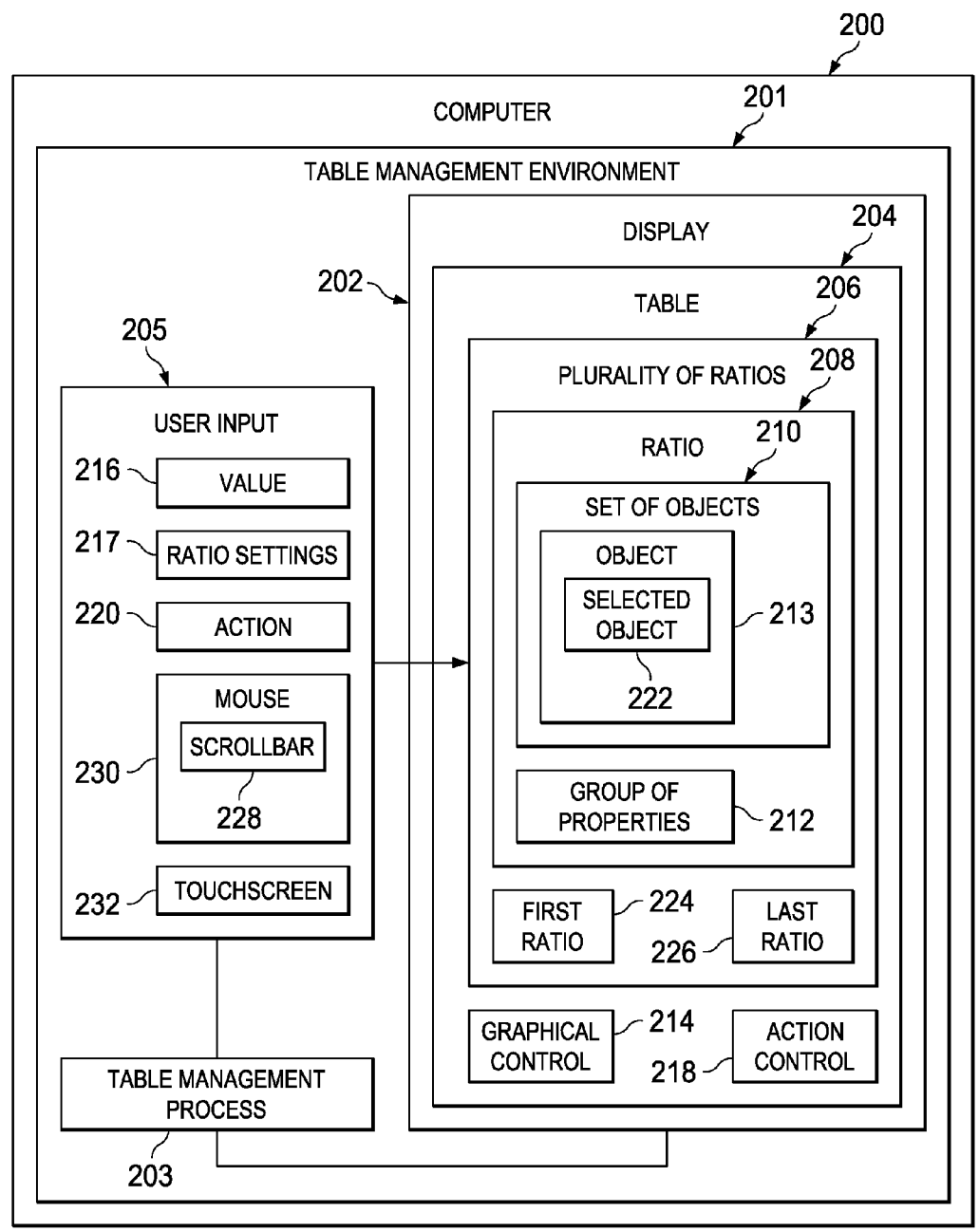
FIG. 2 is an illustration of a block diagram of a table management environment depicted in accordance with an advantageous embodiment.

Turning to FIG. 2, an illustration of a block diagram of a table management environment is depicted in accordance with an advantageous embodiment. Computer 200 in FIG. 2 may be implemented using data processing system 100 in FIG. 1. Computer 200 includes table management environment 201. Table management environment 201 is an example of an environment that may be implemented to process instructions in data processing system 100 in FIG. 1.

In this illustrative example, table management environment 201 includes display 202 and user input 205. Display 202 may be a display on a computer monitor. For example, display 202 may be one example of one illustrative embodiment of display 114 in FIG. 1. Table management environment 201 includes table management process 203. Table management process 203 manages table 204. For example, table management process 203 displays table 204 on display 202. Table management process 203 may be performed in the operating system, as a service in a kernel, a plug-in to a web browser, or some other application. Table 204 may be a table of objects, properties for the objects, or a combination of the two.

In these examples, table 204 includes plurality of ratios 206. Plurality of ratios 206 may include ratio 208 of set of objects 210 relative to group of properties 212 for set of objects 210 in table 204. Ratio 208 may be the number objects in set of objects 210 relative to a number of properties in group of properties 212 for set of objects 210. For example, ratio 208 may be 5 objects with 8 properties per object 213. In another example, ratio 208 may be 10 properties with 4 objects per property. In yet another example, ratio 208 may be 3 objects with 12 properties per object 213. The relationship of objects to properties may be inverse or direct. For example, as the number of objects increase, the number of properties per object 213 may decrease in an inverse relationship. However, in a direct relationship, as the number of objects increase, so does the number of properties per object 213. Table management process 203 manages ratio 208 and plurality of ratios 206 with user input 205.

Table 204 may include graphical control 214. Graphical control 214 may be configured to receive user input 205 of value 216 to control display 202 of set of objects 210 relative to group of properties 212 for set of objects 210 in a table 204. Ratio 208 is changed based on value 216 received from user input 205. In an illustrative embodiment, value 216 may be a number entered from user input 205. For example, value 216 may be user input 205 of a number of objects, where the number of properties for each object 213 is pre-set by the software program. In another illustrative embodiment, value 216 may be user input 205 of a number of objects and the number of properties per object 213. In different illustrative embodiments, value 216 may be a point of a graphic that is selected. For example, a graphic may have 5 bars representing 5 different ratios. Each bar is a possible value 216 that may be selected with user input 205. Table 204 may include ratio settings 217. Ratio settings 217 may be the number of objects and number of properties set for each ratio when only certain ratios are available for selection. In an illustrative embodiment, ratio settings 217 may be set when the software program is written. In different illustrative embodiments, ratio settings 217 may be set by a user with user input 205.

Table 204 may also include action control 218. Action control 218 may be configured to receive user input 205 of action 220 to perform on selected object 222. Action 220 may be a command executed on object 213 of set of objects 210. Action 220 may be, for example, but not limited to, emailing object 213 and the properties of object 213, downloading object 213 and properties for object 213, searching object 213 on the internet, or some other action. Selected object 222 may be object 213 that is currently selected. Object 213 may be selected by checking a box next to it, typing the name of object 213, highlighting object 213, or some other form of selection. In different illustrative embodiments, more than one object 213 may be selected as selected object 222.

Ratio 208 may be changed with user input 205 of value 216. Plurality of ratios 206 may include first ratio 224 and last ratio 226. First ratio 224 may be set to any ratio. In one illustrative embodiment, first ratio 224 of set of objects 210 in table 204 relative to group of properties 212 for set of objects 210 in the table has only objects listed. In this illustrative embodiment, only objects are listed without any properties for any of the objects. In different illustrative embodiments, first ratio 224 may be set to 20 objects with 1 property per object 213, or some ratio may be selected. Last ratio 226 may also be set to any ratio. In one illustrative embodiment, last ratio 226 of set of objects 210 in table 204 relative to group of properties 212 for set of objects 210 in the table has one object listed with all properties for the object accessible. In this illustrative embodiment, one object is shown with properties and all properties for that object are shown in display 202. In different illustrative embodiments, last ratio 226 may be set to 3 objects with 20 properties per object 213, or some ratio may be selected. First ratio 224 and last ratio 226 may be set by a user or pre-set in the software program.

Selected object 222 may also be used to determine which objects of set of objects 210 are visible at different ratios. In an illustrative embodiment, when changing from a ratio with 5 objects to a ratio with 3 objects, the 3 objects visible may be selected object 222 and the 2 adjacent objects. Ratio 208 may include set of objects 210 closest to selected object 222. In different illustrative embodiments, there may not be graphical control 214 in display 202. Graphical control 214 allows for a user to submit user input 205 by clicking a portion of graphical control 214 to change ratio 208. When graphical control 214 is not present, user input 205 may change ratio 208 in other ways. For example, user input 205 may be in the form of scrollbar 228 on mouse 230. As a user turns scrollbar 228, ratio 208 changes. When user input 205 is in the form of turning scrollbar 228, selected object 222 may be object 213 closest to or underneath a mouse pointer in display 202. In another illustrative embodiment, user input 205 may be in the form of touchscreen 232. Touchscreen 232 may be used by touching object 213 on display 202 with a device or body part. Selected object 222 may be object 213 that is touched or closest to being touched. Touchscreen 232 may also be used by touching display 202 with two devices or body parts and either moving the devices closer together or further apart depending on which ratio 208 is desired. Selected object 222 may be object 213 that is in the center of the two devices or closest to being in the center of the two devices. In an illustrative embodiment, ratio 208 may show object 213 with all properties for object 213. In this example, other objects may be visible for selection, but not show properties.

The illustration of table management environment 201 in FIG. 2 is not meant to imply physical or architectural limitations to the manner in which different illustrative embodiments may be implemented. Other components in addition to, and/or in place of, the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative embodiments, scrollbar 228 may be located separately from mouse 230. Additionally, in some illustrative embodiments, touchscreen 232 may be a touchpad that is associated with a screen or display.

Figure 3:
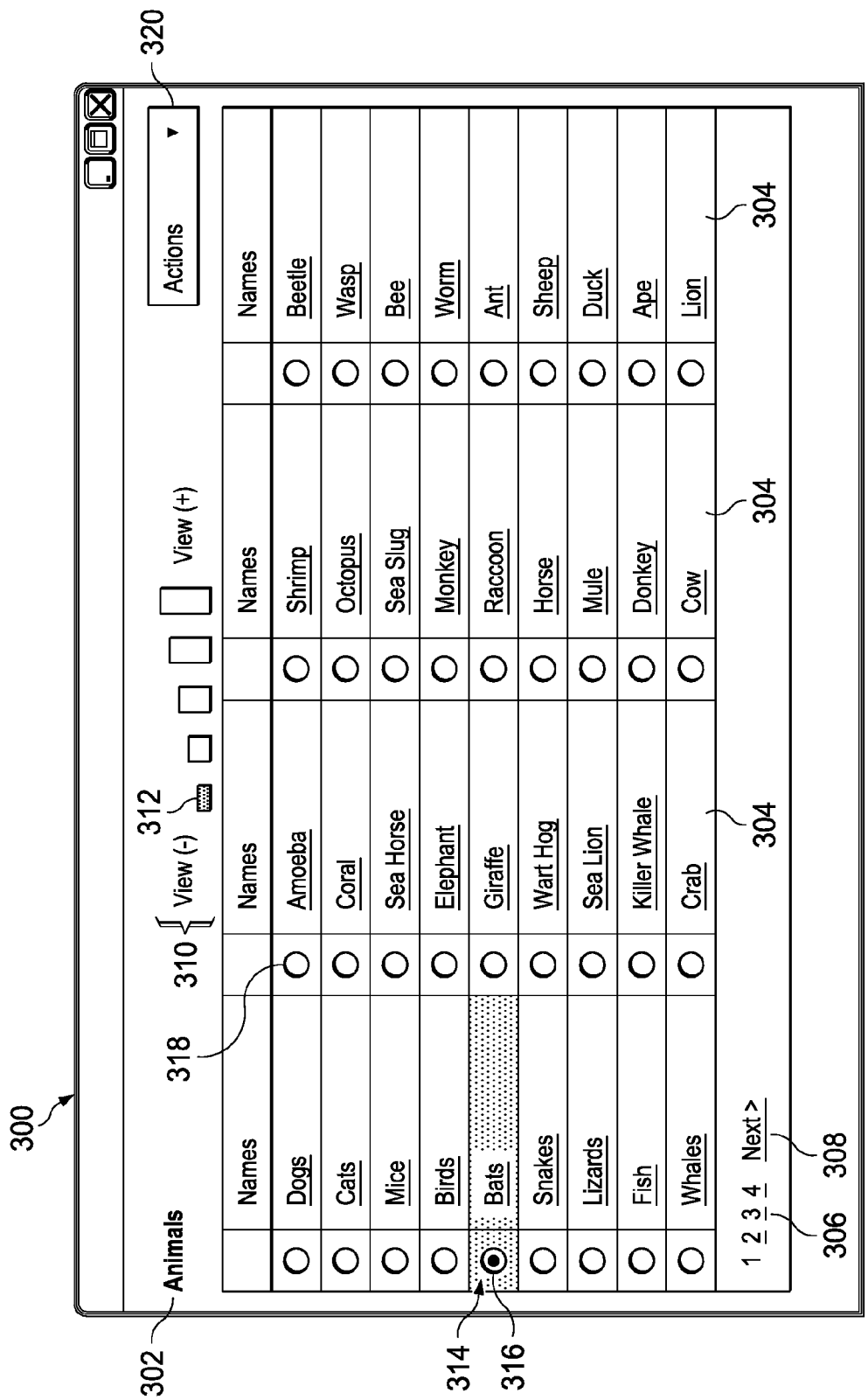
FIG. 3 is a display of a table at a first ratio depicted in accordance with an illustrative embodiment.

Turning to FIG. 3, a display of a table at a first ratio in accordance with an illustrative embodiment is depicted. Table 300 may be one example of one implementation of table 204 in FIG. 2. Table 300 may be one example of one implementation of a ratio of objects to properties per object. The number of properties may be increased or decreased, allowing more or less information to be displayed describing the objects that are visible in each row. As the properties increase, the number of rows of objects decreases and vice versa.

Table 300 has title 302 of "Animals." Title 302 may be other types of categories. Table 300 includes objects 304. Objects 304 may be set of objects 210 in FIG. 2. Table 300 may not include properties for objects 304. Table 300 may not display all objects 304 in title 302. To display other objects 304 in table 300, a user may select a different page 306 or select next 308.

Table 300 includes graphical control 310. Graphical control 310 may be configured to receive user input to control set of objects relative to groups of properties for set of objects in a table 300. Graphical control 310 may be one example of one implementation of graphical control 214 in FIG. 2. Graphical control 310 is currently on first ratio 312. First ratio 312 comprises only objects 304 without any properties displayed in table 300. In one or more illustrative embodiments, the names of objects 304 are considered properties. Therefore, first ratio 312 will have one property per objects 304.

Table 300 includes selected object 314. Selected object 314 is one example of one implementation of selected object 222 in FIG. 2. Selected object 314 may be selected by a user selecting radio button 316 associated with selected object 314. In this illustrative example, selected object 314 is "Bats." Another object may be selected. For example, the object "Amoeba" may be selected by receiving a user input selecting radio button 318.

Table 300 includes action control 320. Action control 320 may be configured to receive user input to select an action to perform on selected object 314. In this illustrative embodiment, action control 320 is a pulldown menu.

Figure 4:
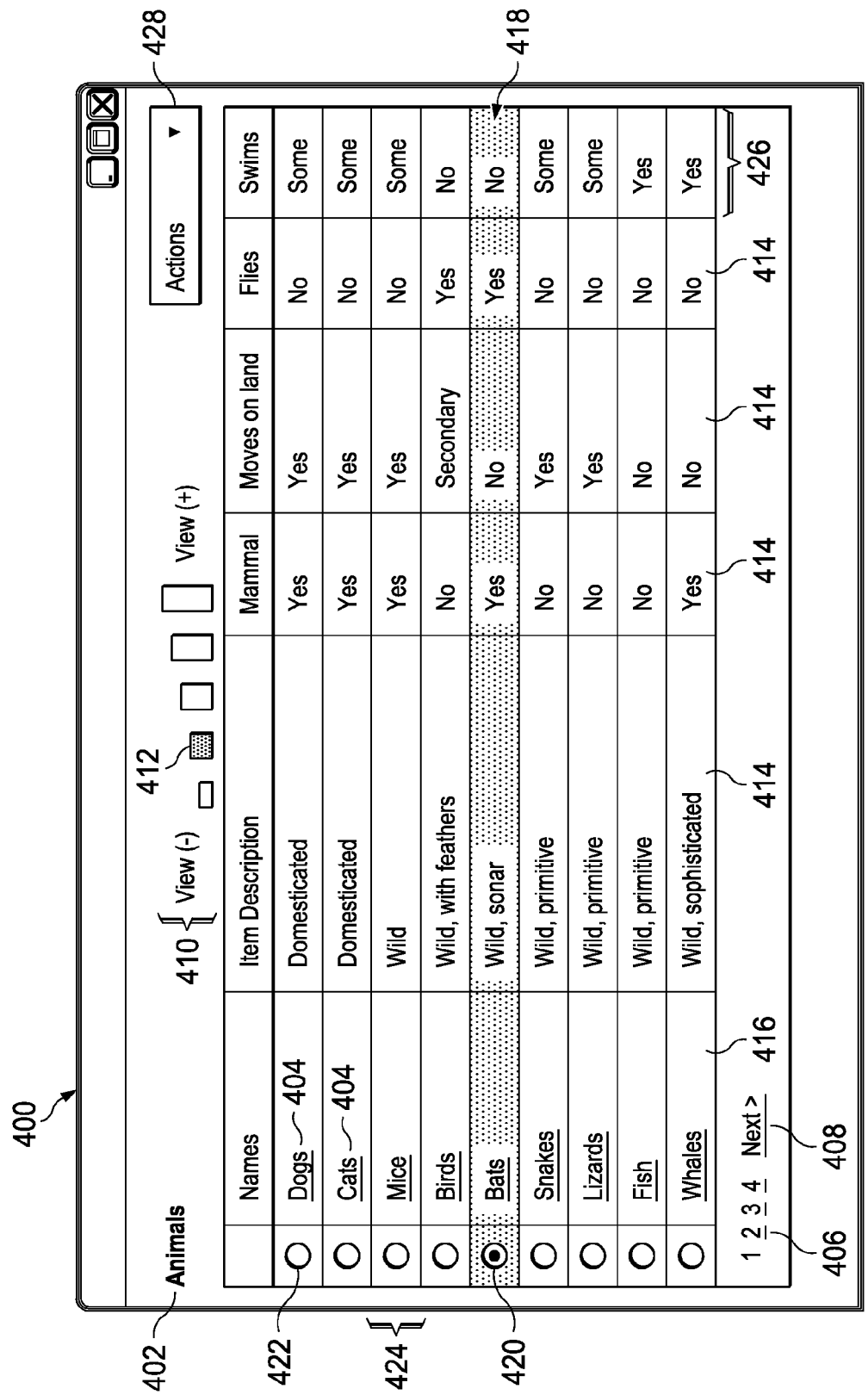
FIG. 4 is a display of a table at a second ratio depicted in accordance with an illustrative embodiment.

Turning to FIG. 4, a display of a table at a second ratio in accordance with an illustrative embodiment is depicted. Table 400 may be one example of one implementation of table 204 in FIG. 2. Table 400 may be one example of one implementation of a ratio of objects to properties per object.

Table 400 has title 402 of "Animals." Title 402 may be other types of categories. Table 400 includes objects 404. Objects 404 may be set of objects 210 in FIG. 2. Table 400 may not display all objects 404 in title 402. To display other objects 404 in table 400, a user may select a different page 406 or select next 408.

Table 400 includes graphical control 410. Graphical control 410 may be configured to receive user input to control set of objects relative to group of properties for set of objects in table 400. Graphical control 410 may be one example of one implementation of graphical control 214 in FIG. 2. Graphical control 410 is currently on second ratio 412. Second ratio 412 comprises 9 objects 404 with 5 properties 414 per object 416 displayed in table 400. In different illustrative embodiments, second ratio 412 may have a different number of objects 404 and properties 414 per object 416.

Table 400 includes selected object 418. Selected object 418 is one example of one implementation of selected object 222 in FIG. 2. Selected object 418 may be selected by a user selecting radio button 420 associated with selected object 418. In this illustrative example, selected object 418 is "Bats."

Another object may be selected. For example, the object "Dogs" may be selected by receiving a user input selecting radio button 422.

Table 400 shows objects 404 listed each in a separate row 424. Table 400 shows properties 414 listed each in a separate column 426. In different illustrative embodiments, objects 404 may be in columns and properties 414 may be in rows.

Table 400 includes action control 428. Action control 428 may be configured to receive user input to select an action to perform on selected object 428. In this illustrative embodiment, action control 428 is a pulldown menu.

Figure 5:
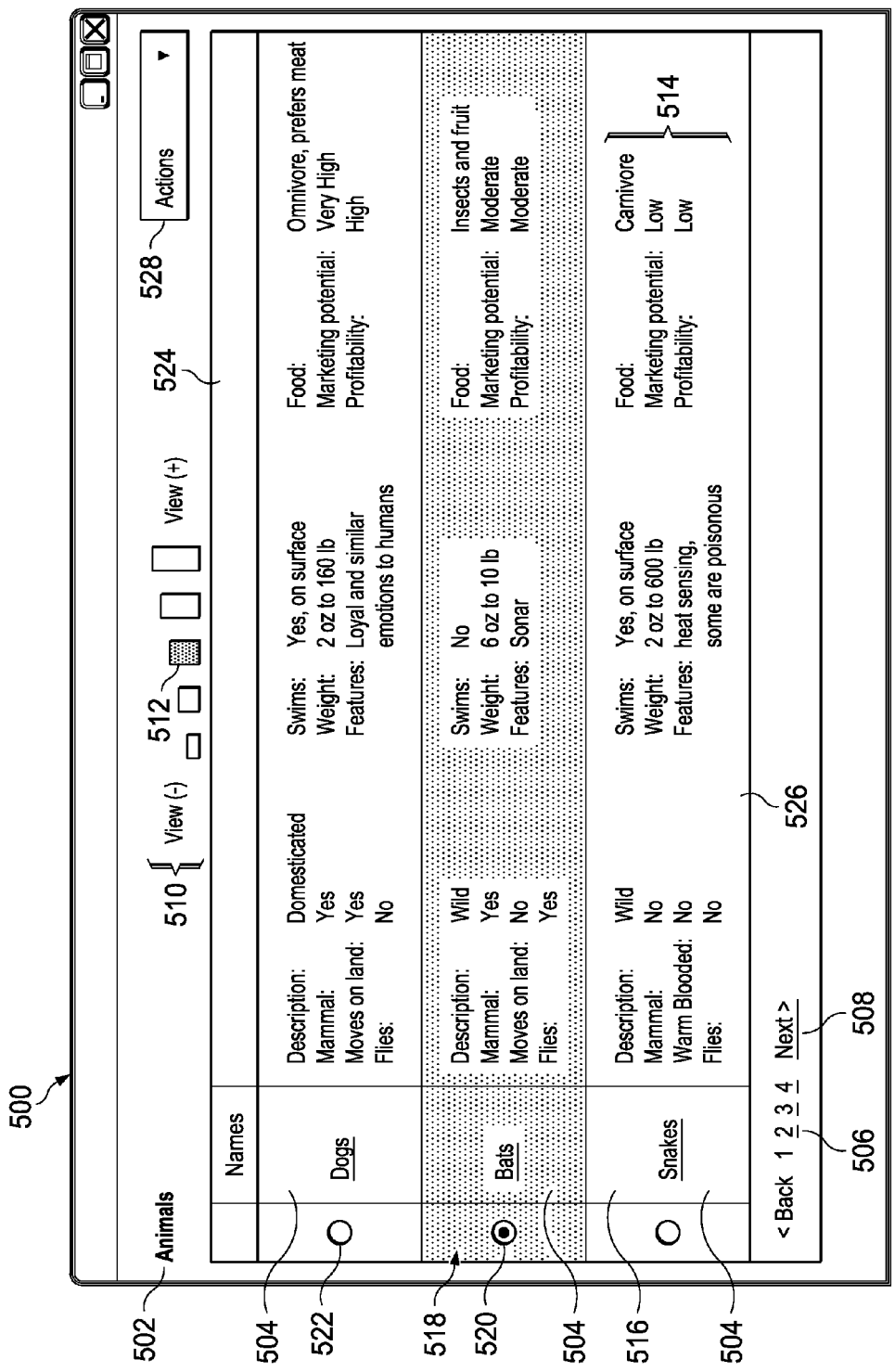
FIG. 5 is a display of a table at a third ratio depicted in accordance with an illustrative embodiment.

Turning to FIG. 5, a display of a table at a third ratio in accordance with an illustrative embodiment is depicted. Table 500 may be one example of one implementation of table 204 in FIG. 2. Table 500 may be one example of one implementation of a ratio of objects to properties per object.

Table 500 has title 502 of "Animals." Title 502 may be other types of categories. Title 502 includes objects 504. Objects 504 may be set of objects 210 in FIG. 2. Table 500 may not display all objects 504 in title 502. To display other objects 504 in table 500, a user may select a different page 506 or select next 508.

Table 500 includes graphical control 510. Graphical control 510 may be configured to receive user input to control set of objects relative to group of properties for set of objects in a table 500. Graphical control 510 may be one example of one implementation of graphical control 214 in FIG. 2. Graphical control 510 is currently on third ratio 512. Third ratio 512 comprises 3 objects 504 with 10 properties 514 per object 516 displayed in table 500. In different illustrative embodiments, third ratio 512 may have a different number of objects 504 and properties 514 per object 516.

Table 500 includes selected object 518. Selected object 518 is one example of one implementation of selected object 222 in FIG. 2. Selected object 518 may be selected by a user selecting radio button 520 associated with selected object 518. In this illustrative example, selected object 518 is "Bats." Another object may be selected. For example, the object "Dogs" may be selected by receiving a user input selecting radio button 522. As can be seen, as a user selects a different ratio on graphical interface 510, a different number of objects 504 are displayed. Objects 504 which are displayed are objects 504 closest to selected object 518.

Table 500 shows objects 504 listed each in a separate row 524 and in a single column 526. Table 500 shows properties 514 for each object 516 listed in a single cell 526.

Table 500 includes action control 528. Action control 528 may be configured to receive user input to select an action to perform on selected object 518. In this illustrative embodiment, action control 528 is a pulldown menu.

Figure 6:
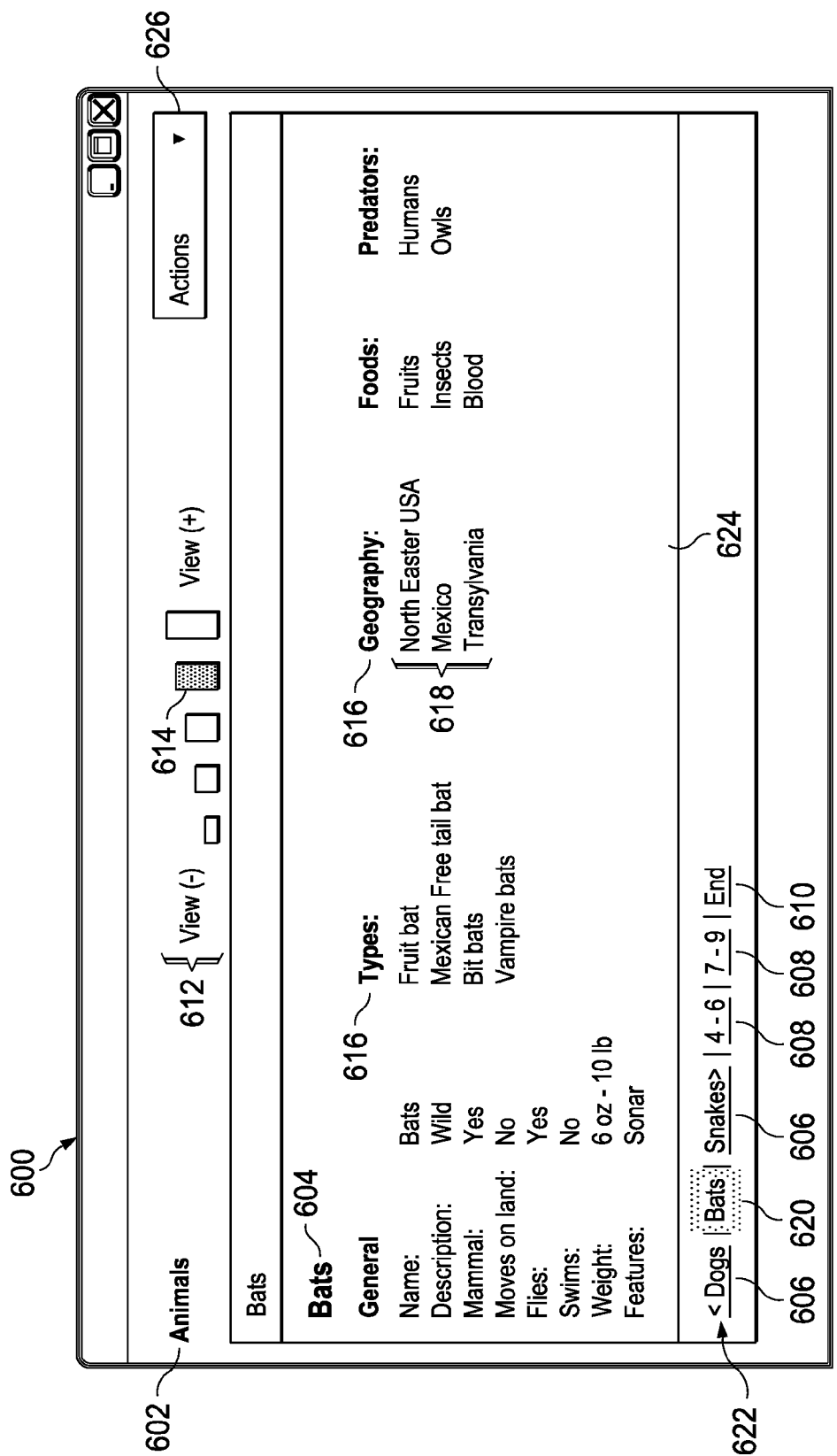
FIG. 6 is a display of a table at a fourth ratio depicted in accordance with an illustrative embodiment.

Turning to FIG. 6, a display of a table at a fourth ratio in accordance with an illustrative embodiment is depicted. Table 600 may be one example of one implementation of table 204 in FIG. 2. Table 600 may be one example of one implementation of a ratio of objects to properties per object.

Table 600 has title 602 of "Animals." Title 602 may be other types of categories. Title 602 includes object 604. Object 604 may be set of objects 210 in FIG. 2. Table 600 may not display all objects in title 602. To display other objects in table 600, a user may select adjacent object 606, range of pages 608, or end 610 of the list of objects for title 602.

Table 600 includes graphical control 612. Graphical control 612 may be configured to receive user input to control set of objects relative to group of properties for set of objects in a table 600. Graphical control 612 may be one example of one implementation of graphical control 214 in FIG. 2. Graphical control 612 is currently on fourth ratio 614. Fourth ratio 614 comprises 1 object 604 with 5 types 616 of properties 618 per object 604 displayed in table 600. In different illustrative embodiments, fourth ratio 614 may have a different number of objects, types 616 of properties 618, and properties 618 per object 604.

Table 600 includes selected object 620. Selected object 620 is one example of one implementation of selected object 222 in FIG. 2. In this illustrative example, selected object 620 is "Bats." Another object may be selected. For example, the object "Dogs" may be selected by receiving a user input selecting dogs 622. As can be seen, as a user selects a different ratio on graphical control 612, a different number of objects are displayed. The object which is displayed is object 604 which is selected object 620. Table 600 shows object 604 listed in a single cell 624 along with properties 618 for object 604.

Table 600 includes action control 626. Action control 626 may be configured to receive user input to select an action to perform on selected object 626. In this illustrative embodiment, action control 626 is a pulldown menu.

Figure 7:
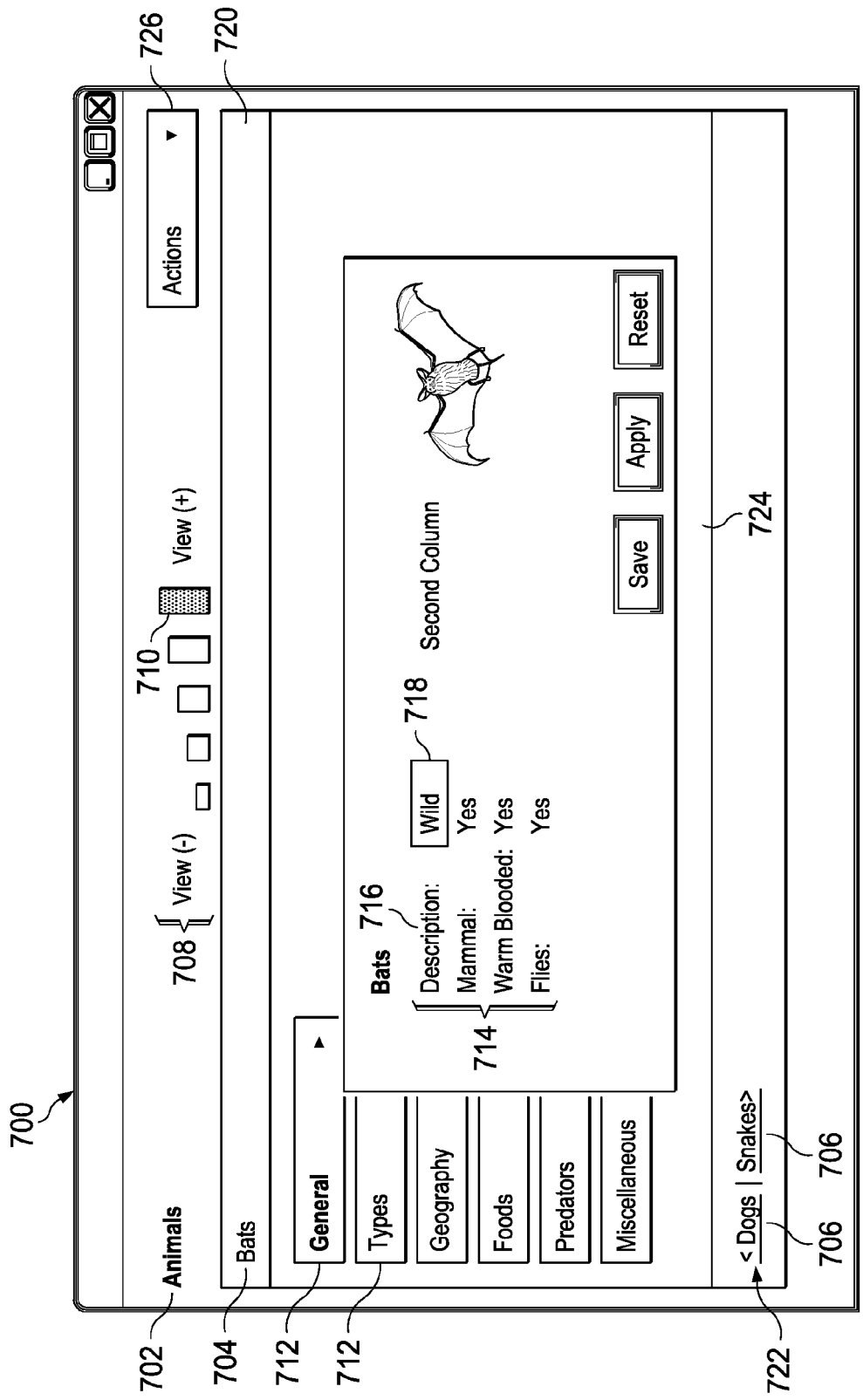
FIG. 7 is a display of a table at a fifth ratio depicted in accordance with an illustrative embodiment.

Turning to FIG. 7, a display of a table at a fifth ratio in accordance with an illustrative embodiment is depicted. Table 700 may be one example of one implementation of table 204 in FIG. 2. Table 700 may be one example of one implementation of a ratio of objects to properties per object.

Table 700 has title 702 of "Animals." Title 702 may be other types of categories. Title 702 includes object 704. Object 704 may be set of objects 210 in FIG. 2. Table 700 may not display all objects in title 702. To display other objects in table 700, a user may select adjacent object 706.

Table 700 includes graphical control 708. Graphical control 708 may be configured to receive user input to control set of objects relative to group of properties for set of objects in a table 700. Graphical control 708 may be one example of one implementation of graphical control 214 in FIG. 2. Graphical control 708 is currently on fifth ratio 710. Fifth ratio 710 comprises 1 object 704 with 6 types 712 of properties 714 per object 704 displayed in table 700. In different illustrative embodiments, fifth ratio 710 may have a different number of objects, types 712 of properties 714, and properties 714 per object 704. In fifth ratio 710, each property 714 may be editable. For example, property 716 is editable in box 718. Additionally, in illustrative embodiments, properties 714 may be added.

Table 700 includes selected object 720. Selected object 720 is one example of one implementation of selected object 222 in FIG. 2. In this illustrative example, selected object 722 is "Bats." Another object may be selected. For example, the object "Dogs" may be selected by receiving a user input selecting dogs 722. As can be seen, as a user selects a different ratio on graphical interface 708, a different number of objects are displayed. The object which is displayed is object 704 which is selected object 720. Table 700 shows object 704 listed in a single cell 724 along with types 712 of properties 714 and properties 714 for object 704. Only the type of types 712 shows properties 714 for the type selected. Other types 712 may be selected in a similar manner as object 704 is selected.

Table 700 includes action control 726. Action control 726 may be configured to receive user input to select an action to perform on selected object 720. In this illustrative embodiment, action control 726 is a pulldown menu.

Figure 8:
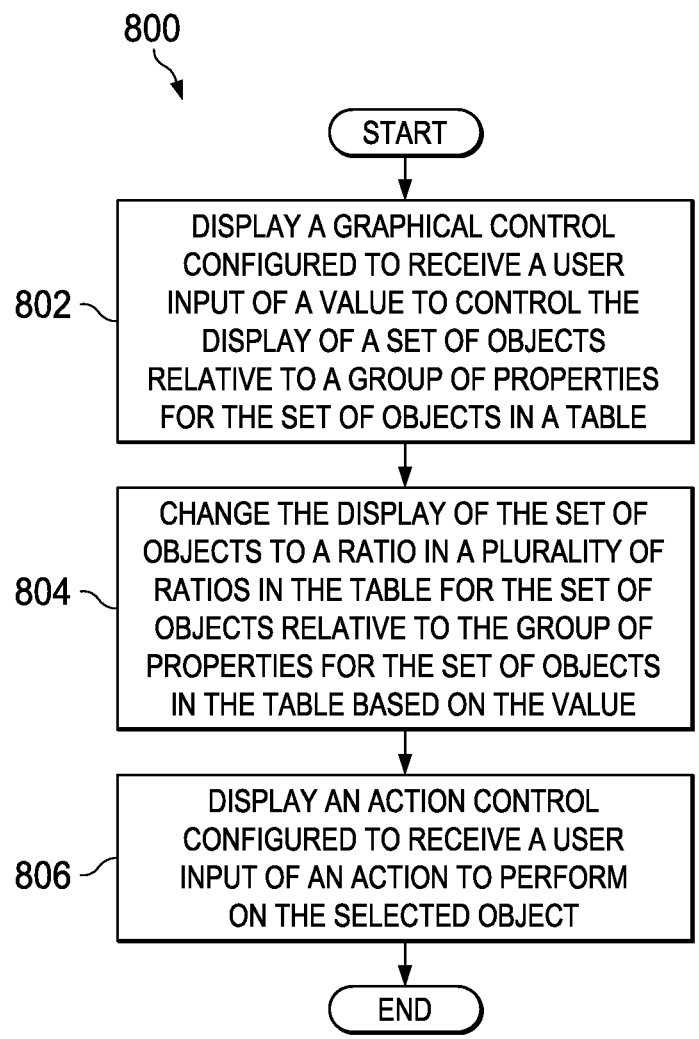
FIG. 8 is a flowchart of a process for managing a display of objects depicted in accordance with an illustrative embodiment.

Turning to FIG. 8, a flowchart of a process for managing a display of objects in accordance with an illustrative embodiment is depicted. Process 800 illustrated in FIG. 8 may be implemented in table management environment 201 in FIG.

2. Process 800 illustrated in FIG. 8 may be implemented as program code for table management process 203 in FIG. 2.

Process 800 begins by displaying a graphical control configured to receive a user input of a value to control the display of a set of objects relative to a group of properties for the set of objects in a table (step 802). A first ratio of the set of objects in the table relative to the level of properties for the set of objects in the table may have only objects listed. A last ratio of the set of objects in the table relative to the level of properties for the set of objects in the table may have one object listed with all properties for the object accessible. Each ratio of the plurality of ratios may comprise objects of the set of objects closest to the selected object in the table. More than one object of the set of objects may be displayed at every ratio of the plurality of ratios.

The process then changes the display of the set of objects to a ratio in a plurality of ratios in the table for the set of objects relative to the group of properties for the set of objects in the table based on the value (step 804). Changing the display of the set of objects to a ratio in a plurality of ratios in the table for the set of objects relative to the group of properties for the set of objects in the table based on the value may comprise changing the display of the ratio of the plurality of ratios of the set of objects in the table by showing the objects of the set of objects nearest the selected object in response to receiving a user input of a selected object to decrease the set of object and increase the group of properties for the set of objects.

The process displays an action control configured to receive a user input of an action to perform on the selected object (step 806). Additionally, properties may be edited by receiving user input. Thereafter, the process terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the different illustrative embodiments provide a method, computer system, and computer program product to manage a display of objects. This disclosure proposes a table that allows a user to select different ratios of objects and properties to those objects. The customization of settings for the ratios may be done by the software programmer and/or a user.

The different illustrative embodiments provide a method, computer system, and computer program product to manage a display of objects. A processor unit displays a graphical control configured to receive a user input of a value to control the display of a set of objects relative to a group of properties for the set of objects in a table. A processor unit changes the display of the set of objects to a ratio in a plurality of ratios in the table for the set of objects relative to the group of properties for the set of objects in the table based on the value.

The terminology used herein is for the purpose of describing particular embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable data storage medium providing program code for use by or in connection with a computer or any instruction execution system. For the purposes of this description, a computer-usable or computer-readable data storage medium can be any tangible apparatus that can store the program for use by or in connection with the instruction execution system, apparatus, or device.

The computer-readable data storage medium can be an electronic, magnetic, optical, or semiconductor system (or apparatus or device). Examples of a computer-readable data storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing a display of objects, the method comprising:
   receiving, by a computer, a first input specifying a number of objects in a set of objects to display in a table and a second input specifying a number of properties in a set of properties for each object in the specified number of objects to display in the table, and in response, displaying the specified number of objects in the table with the specified number of properties for each respective object in the specified number of objects, wherein the specified number of properties for each respective object in the specified number of objects provides information describing a respective object;
   responsive to the computer receiving a third input selecting a ratio setting of one of a plurality of ratio settings, changing, by the computer, the display of the specified number of objects and the specified number of properties in the set of properties for each object in the table according to the selected ratio setting;
   responsive to the computer receiving a fourth input selecting an object in the specified number of objects displayed in the table, changing, by the computer, the display of the specified number of objects by displaying those objects in the specified number of objects adjoining the selected object in the table and avoiding display of another one of the objects in the specified number which is not adjoining the selected object in the table, wherein the specified number of properties that provides the information describing the respective object is displayed with each of the selected object and the adjoining objects in the table;
   receiving, by the computer, a fifth input of a specified action to perform on the selected object in the specified number of objects displayed in the table, wherein the specified action to perform on the selected object is one of emailing the selected object and properties associated with the selected object, downloading the selected object and the properties associated with the selected object, or searching for the selected object on a network; and
   performing, by the computer, the specified action based on the fifth input.

2. The method of claim 1, wherein a first ratio of a number of objects displayed in the table relative to a number of properties associated with each object in the number of objects includes only objects.

3. The method of claim 1, wherein a last ratio of a number of objects displayed in the table relative to a number of properties associated with each object in the number of objects includes one object with all properties associated with the one object.

4. The method of claim 1, further comprising:
   receiving, by the computer, an input selecting a ratio setting between a number of objects and a number of properties associated with each object in the set of objects to be displayed in the table.

5. The method of claim 4, wherein one or more objects in the number of objects is displayed at each selected ratio setting.

6. The method of claim 1, wherein the displaying of those objects in the specified number of objects adjoining the selected object in the table and the avoiding of the display of another one of the objects in the specified number which is not adjoining the selected object in the table reduces an amount of information displayed in the table.

7. A computer system for managing a display of objects, the computer system comprising:
   one or more processors, one or more computer-readable memories, and one or more computer-readable tangible storage devices;
   program instructions, stored on at least one of the one or more computer-readable tangible storage devices for execution by at least one of the one or more processors via at least one of the one or more computer-readable memories, to receive a first input specifying a number of objects in a set of objects to display in a table and a second input specifying a number of properties in a set of properties for each object in the specified number of objects to display in the table, and in response, program instructions, stored on at least one of the one or more computer-readable tangible storage devices for execution by at least one of the one or more processors via at least one of the one or more computer-readable memories, to display the specified number of objects in the table with the specified number of properties for each respective object in the specified number of objects, wherein the specified number of properties for each respective object in the specified number of objects provides information describing a respective object;
   program instructions, stored on at least one of the one or more computer-readable tangible storage devices for execution by at least one of the one or more processors via at least one of the one or more computer-readable memories, responsive to receiving a third input selecting a ratio setting of one of a plurality of ratio settings, to change the display of the specified number of objects and the specified number of properties in the set of properties for each object in the table according to the selected ratio setting;
   program instructions, stored on at least one of the one or more computer-readable tangible storage devices for execution by at least one of the one or more processors via at least one of the one or more computer-readable memories, responsive to receiving a fourth input selecting an object in the specified number of objects displayed in the table, to change the display of the specified number of objects by displaying those objects in the specified number of objects adjoining the selected object in the table and avoiding display of another one of the objects in the specified number which is not adjoining the selected object in the table, wherein the specified number of properties that provides the information describing the respective object is displayed with each of the selected object and the adjoining objects in the table;
   program instructions, stored on at least one of the one or more computer-readable tangible storage devices for execution by at least one of the one or more processors via at least one of the one or more computer-readable memories, to receive a fifth input of a specified action to perform on the selected object in the specified number of objects displayed in the table, wherein the specified action to perform on the selected object is one of emailing the selected object and properties associated with the selected object, downloading the selected object and the properties associated with the selected object, or searching for the selected object on a network; and program instructions, stored on at least one of the one or more computer-readable tangible storage devices for execution by at least one of the one or more processors via at least one of the one or more computer-readable memories, to perform the specified action based on the fifth input.

8. The computer system of claim 7, wherein a first ratio of a number of objects displayed in the table relative to a number of properties associated with each object in the number of objects includes one property associated with each object, wherein the one property is a name of the object.

9. The computer system of claim 7, wherein a last ratio of a number of objects displayed in the table relative to a number of properties associated with each object in the number of objects includes one object with all properties associated with the one.

10. The computer system of claim 7 further comprising:
program instructions, stored on at least one of the one or more computer-readable tangible storage devices for execution by at least one of the one or more processors via at least one of the one or more computer-readable memories, to receive an input selecting a ratio setting between a number of objects and a number of properties associated with each object in the set of objects to be displayed in the table.

11. The computer system of claim 10, wherein one or more objects in the number of objects is displayed at each selected ratio setting.

12. A computer program product for managing a display of objects, the computer program product comprising:
one or more non-transitory computer-readable storage media;
program instructions, stored on at least one of the one or more non-transitory computer-readable storage media, to receive a first input specifying a number of objects in a set of objects to display in a table and a second input specifying a number of properties in a set of properties for each object in the specified number of objects to display in the table, and in response,
program instructions, stored on at least one of the one or more non-transitory computer-readable storage media, to display the specified number of objects in the table with the specified number of properties for each respective object in the specified number of objects, wherein the specified number of properties for each respective object in the specified number of objects provides information describing a respective object;

program instructions, stored on at least one of the one or more non-transitory computer-readable storage media, responsive to receiving a third input selecting a ratio setting of one of a plurality of ratio settings, to change the display of the specified number of objects and the specified number of properties in the set of properties for each object in the table according to the selected ratio setting;

program instructions, stored on at least one of the one or more non-transitory computer-readable storage media, responsive to receiving a fourth input selecting an object in the specified number of objects displayed in the table, to change the display of the specified number of objects by displaying those objects in the specified number of objects adjoining the selected object in the table and avoiding display of another one of the objects in the specified number which is not adjoining the selected object in the table, wherein the specified number of properties that provides the information describing the respective object is displayed with each of the selected object and the adjoining objects in the table;

program instructions, stored on at least one of the non-transitory computer-readable storage media, to receive a fifth input of a specified action to perform on the selected object in the specified number of objects displayed in the table, wherein the specified action to perform on the selected object is one of emailing the selected object and properties associated with the selected object, downloading the selected object and the properties associated with the selected object, or searching for the selected object on a network; and program instructions, stored on at least one of the non-transitory computer-readable storage media, to perform the specified action based on the fifth input.

13. The computer program product of claim 12, wherein a first ratio of a number of objects displayed in the table relative to a number of properties associated with each object in the number of objects includes only objects.

14. The computer program product of claim 12, wherein a last ratio of a number of objects displayed in the table relative to a number of properties associated with each object in the number of objects includes one object with all properties associated with the one object.

15. The computer program product of claim 12 further comprising:
program instructions, stored on at least one of the one or more non-transitory computer-readable storage media, to receive an input selecting a ratio setting between a number of objects and a number of properties associated with each object in the number of objects to be displayed in the table.

16. The computer program product of claim 15, wherein one or more objects in the number of objects is displayed at each selected ratio setting.

* * * * *